US011933637B2

(12) United States Patent
Joseph

(10) Patent No.: US 11,933,637 B2
(45) Date of Patent: Mar. 19, 2024

(54) STEEL BARREL ROTATION ASSEMBLY

(71) Applicant: Ancliff Joseph, Goodyear, AZ (US)

(72) Inventor: Ancliff Joseph, Goodyear, AZ (US)

( * ) Notice: Subject to any disclaimer, the term of this patent is extended or adjusted under 35 U.S.C. 154(b) by 180 days.

(21) Appl. No.: 17/738,083

(22) Filed: May 6, 2022

(65) Prior Publication Data
US 2023/0358578 A1 Nov. 9, 2023

(51) Int. Cl.
*G01D 13/08* (2006.01)
*B21D 22/18* (2006.01)
*B21D 26/021* (2011.01)
*B25B 11/00* (2006.01)

(52) U.S. Cl.
CPC .............. *G01D 13/08* (2013.01); *B21D 22/18* (2013.01); *B21D 26/021* (2013.01); *B25B 11/00* (2013.01)

(58) Field of Classification Search
CPC ...... G01D 13/08; B21D 22/18; B21D 26/021; B21D 1/06; B21D 1/065; B21D 1/08; B25B 11/00; B25B 11/02; B23K 26/0823; B23K 37/053; B23K 37/04; A47B 11/00
USPC ...... 269/55, 289 R, 302; 108/139; 248/349.1
See application file for complete search history.

(56) References Cited

U.S. PATENT DOCUMENTS

| 6,212,772 | B1 | 4/2001 | Whitmyre |
| 7,745,711 | B2 | 6/2010 | Kerns |
| 8,455,745 | B2 | 6/2013 | Dusin |
| 8,552,279 | B2 | 10/2013 | Rohner |
| 10,559,288 | B2 | 2/2020 | Sargeant |
| 10,654,087 | B2 | 5/2020 | Wahtuse |

FOREIGN PATENT DOCUMENTS

| CN | 112454216 A | * | 3/2021 |
| WO | WO2010145695 | | 12/2010 |
| WO | WO2019064051 | | 4/2019 |

* cited by examiner

*Primary Examiner* — Lee D Wilson
*Assistant Examiner* — Caleb Andrew Holizna

(57) ABSTRACT

A steel barrel rotation assembly for rotating a steel barrel for manufacturing a steelpan drum includes a base that is positionable on a horizontal support surface, a plurality of legs extending upwardly from the base and a mounting disk attached to the plurality of legs. A rotation disk is rotatably disposed on the mounting disk and a steel barrel can be positioned on the rotation disk. A drive unit is coupled to the mounting disk and the drive unit mechanically engages the rotation disk. The drive unit rotates the rotation disk when the drive unit is turned on to rotate the steel barrel. A plurality of holders is each of the holders is slidably disposed on the rotation disk. Each of the holders extends upwardly from the rotation disk to engage the steel barrel for securing the steel barrel on the rotation disk.

12 Claims, 4 Drawing Sheets

STEEL BARREL ROTATION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to rotation devices and more particularly pertains to a new rotation device for rotating a steel barrel for manufacturing a steelpan drum. The device includes a base, a plurality of legs extending upwardly from the base and a mounting disk attached to the legs. The device includes a rotation disk that is rotatably disposed on the mounting disk and a drive unit that mechanically engages the rotation disk for rotating the rotation disk. The device includes a sleeve extending upwardly from the rotation disk for securing a steel barrel on the rotation disk and a plurality of holders which each extends upwardly from the sleeve to secure the steel barrel in the sleeve.

(2) Description of Related Art Including Information Disclosed Under 37 CFR 1.97 and 1.98

The prior art relates to rotation devices including a steelpan device that includes a steelpan drum, a sleeve to insertably receive the steelpan drum and a ring for securing the steelpan drum in the sleeve. The prior art discloses a method of manufacturing a steelpan drum that includes welding a sheet of steel into a cylindrical shape. The prior art discloses a method of manufacturing a steelpan drum that includes an articulated arm and a pneumatic hammer attached to the articulated arm. The prior art discloses a method of manufacturing a steelpan drum that includes a steel sheet that is coated with a nitride treatment. The prior art discloses a steelpan drum that is structured to produce soprano pitches. The prior art discloses a steelpan manufacturing device that includes a concave die mold and a pressure lid for forming a steelpan drum.

BRIEF SUMMARY OF THE INVENTION

An embodiment of the disclosure meets the needs presented above by generally comprising a base that is positionable on a horizontal support surface, a plurality of legs extending upwardly from the base and a mounting disk attached to the plurality of legs. A rotation disk is rotatably disposed on the mounting disk and a steel barrel can be positioned on the rotation disk. A drive unit is coupled to the mounting disk and the drive unit mechanically engages the rotation disk. The drive unit rotates the rotation disk when the drive unit is turned on to rotate the steel barrel. A plurality of holders is each of the holders is slidably disposed on the rotation disk. Each of the holders extends upwardly from the rotation disk to engage the steel barrel for securing the steel barrel on the rotation disk.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
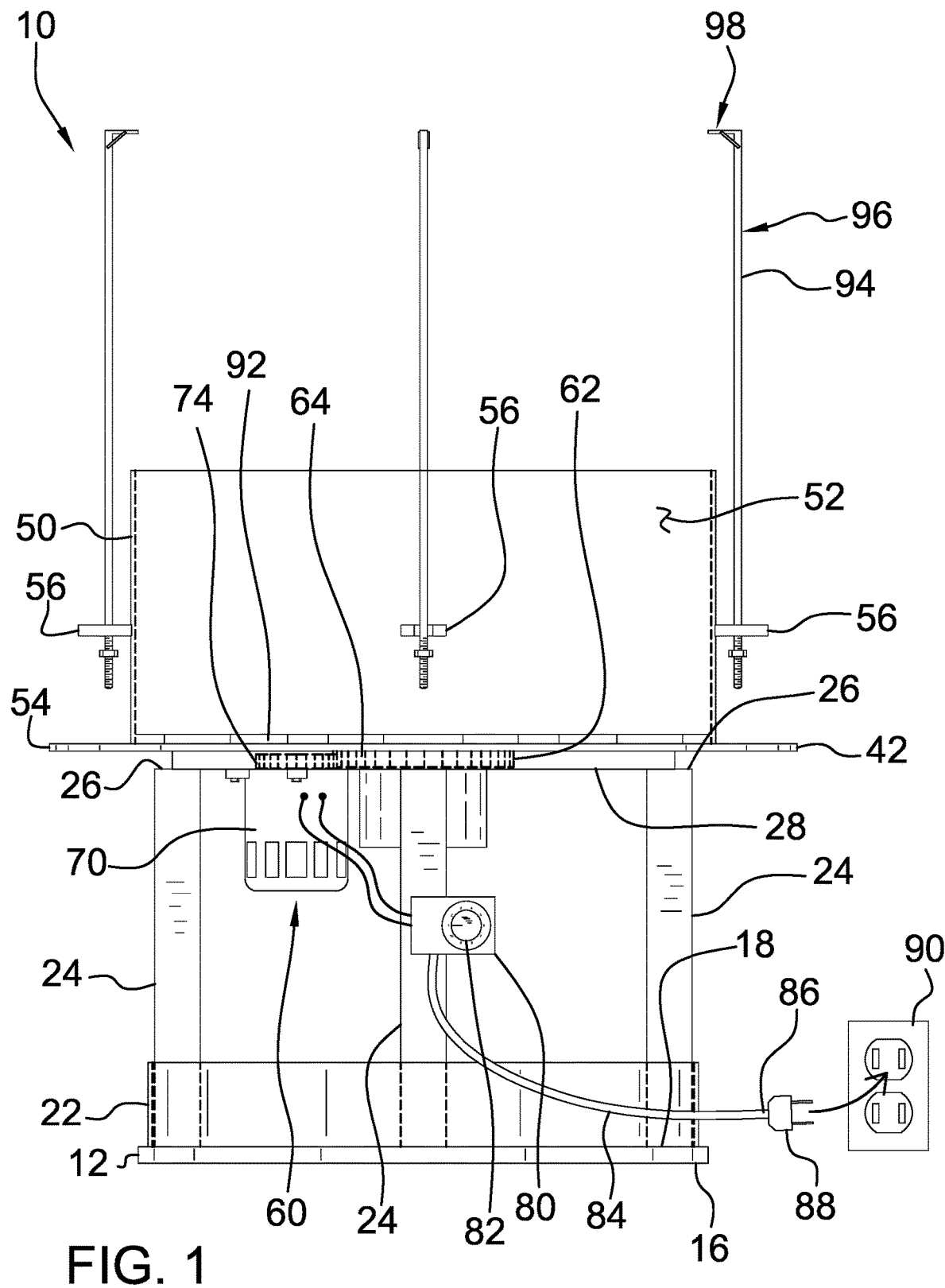
FIG. 1 is a front view of a steel barrel rotation assembly according to an embodiment of the disclosure.
Figure 2:
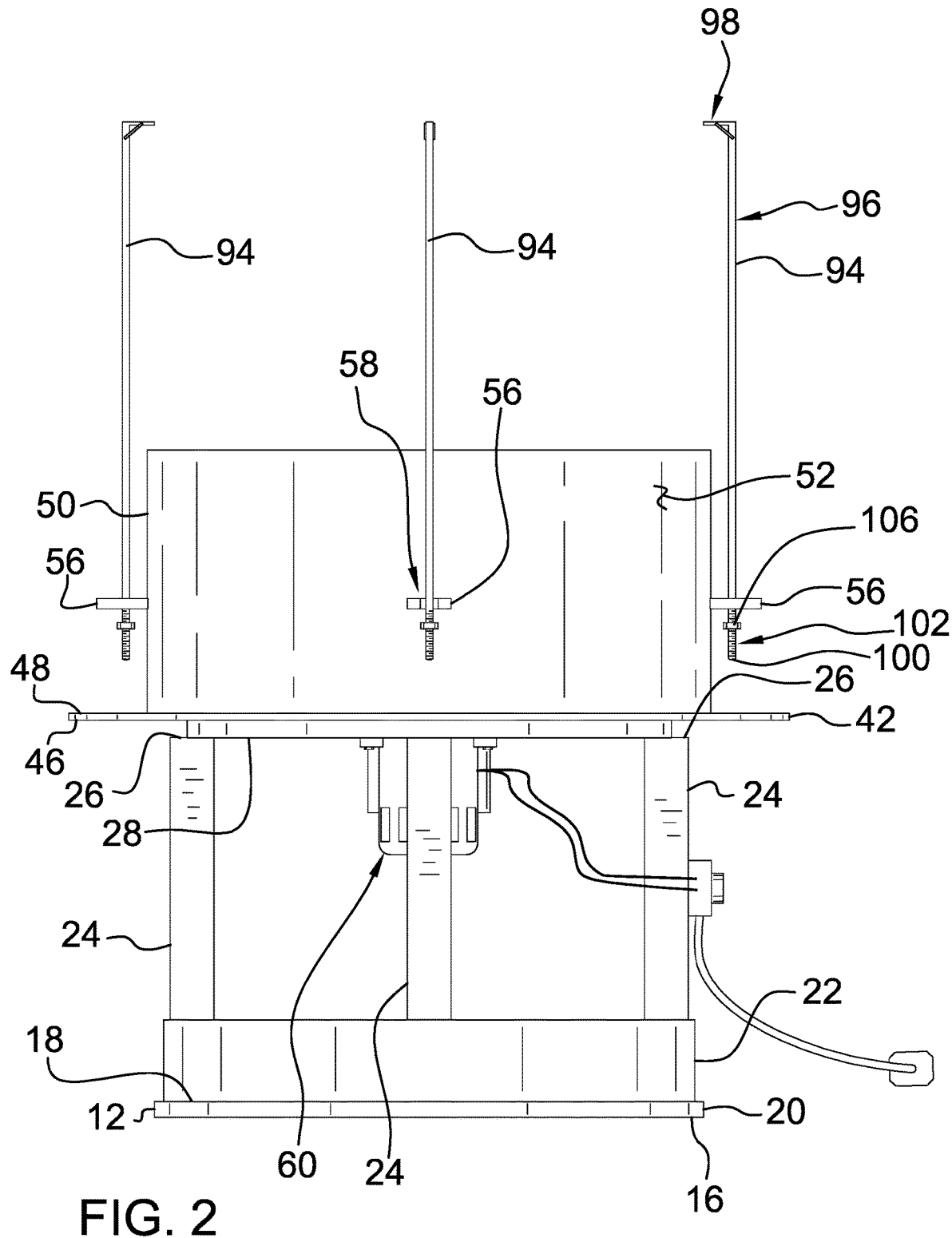
FIG. 2 is a left side view of an embodiment of the disclosure.
Figure 3:
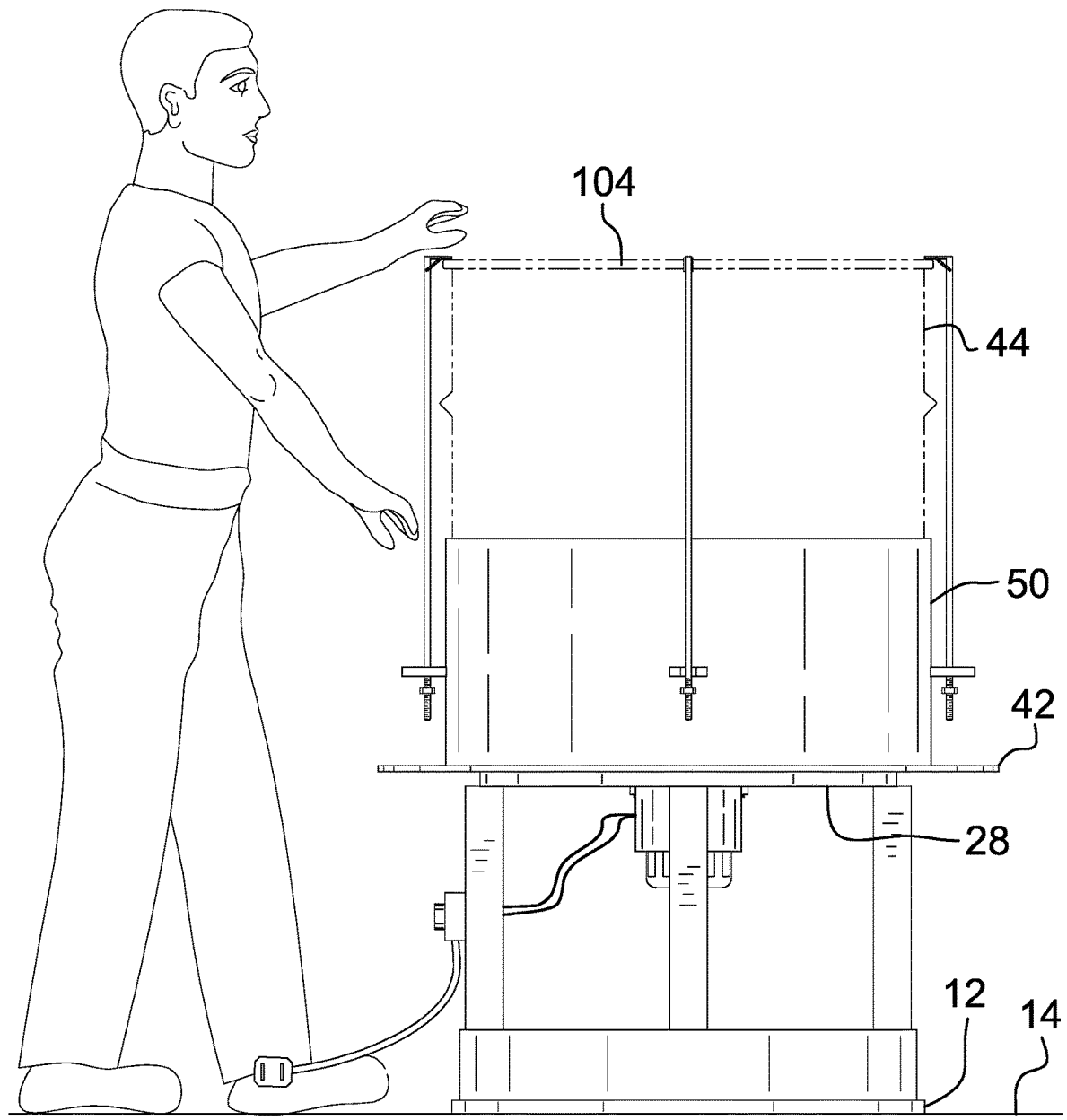
FIG. 3 is a perspective in-use view of an embodiment of the disclosure.
Figure 4:
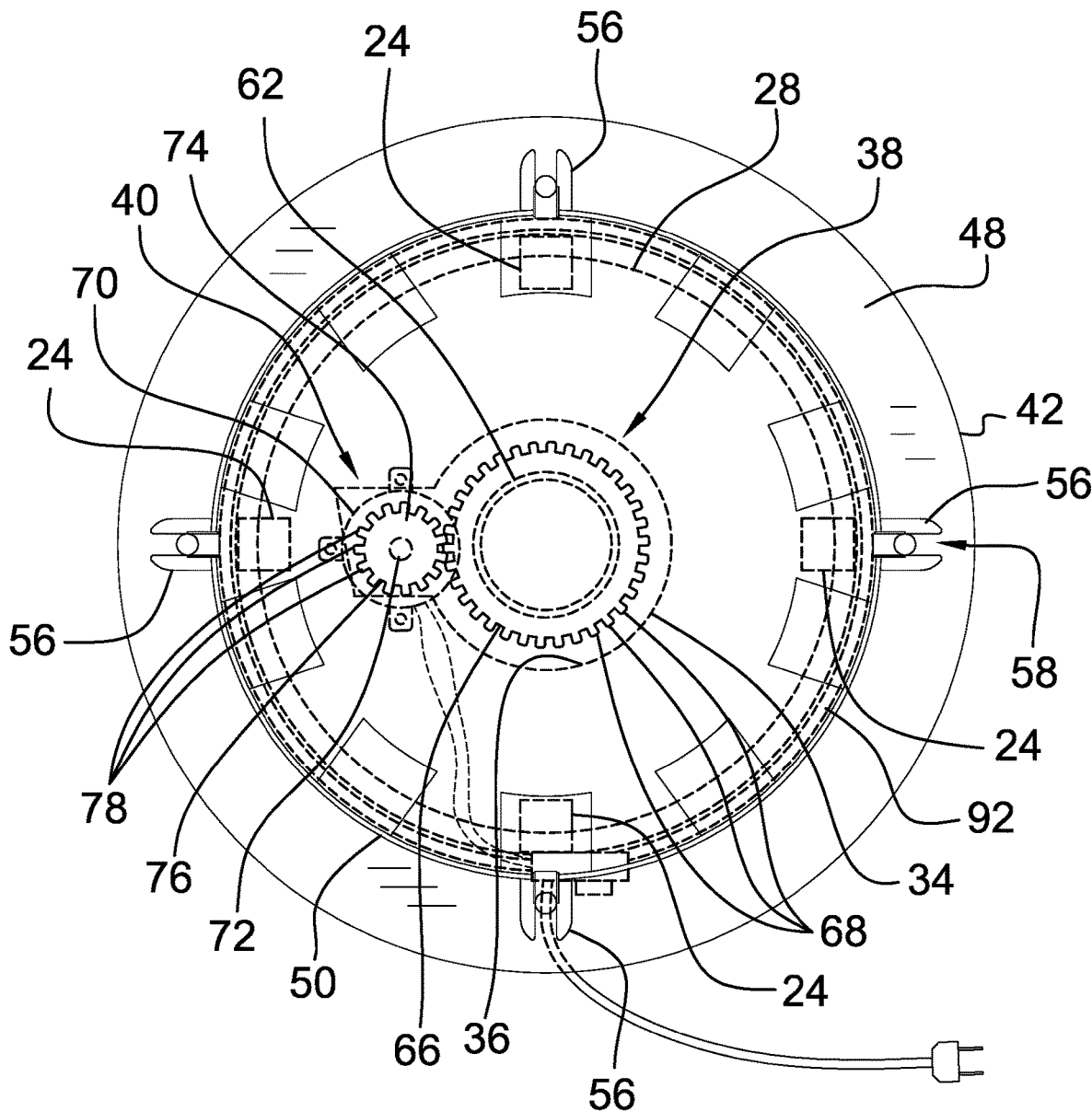
FIG. 4 is a top phantom view of an embodiment of the disclosure.

With reference now to the drawings, and in particular to FIGS. 1 through 4 thereof, a new rotation device embodying the principles and concepts of an embodiment of the disclosure and generally designated by the reference numeral 10 will be described.

As best illustrated in FIGS. 1 through 4, the steel barrel rotation assembly 10 generally comprises a base 12 that is positionable on a horizontal support surface 14 such as a floor, a table top or other similar support surface 14. The base 12 has a bottom surface 16, a top surface 18 and a perimeter edge 20 extending between the top surface 18 and the bottom surface 16. The base 12 has a lip 22 extending upwardly from the top surface 18, the lip 22 is spaced inwardly from the perimeter edge 20 and the lip 22 extends around a full circumference of the base 12. A plurality of legs 24 is each coupled to and extends upwardly from the base 12, and each of the legs 24 is disposed on the top surface 18 of the base 12. Each of the legs 24 is positioned against the lip 22, the legs 24 are spaced apart from each other and are distributed around a full circumference of the lip 22, and each of the legs 24 has a distal end 26 with respect to the top surface 18 of the base 12.

A mounting disk 28 is attached to the plurality of legs 24 such that the mounting disk 28 is spaced upwardly from the base 12. The mounting disk 28 has a lower surface 30 and an upper surface 32, and the distal end 26 of each of the legs 24 is coupled to the lower surface 30 such that the mounting disk 28 is aligned with the base 12. The mounting disk 28 has an opening 34 extending through the lower surface 30 and the upper surface 32 and the opening 34 has a bounding edge 36. The bounding edge 36 has a continuously arcuate portion 38 defining a circle, the bounding edge 36 has a rectilinear portion 40 defining a parallelogram extending away from the circle, and the continuously arcuate portion 38 is centrally positioned on the mounting disk 28.

A rotation disk 42 is rotatably disposed on the mounting disk 28 and a steel barrel 44 can be positioned on top of the rotation disk 42. The steel barrel 44 may be a 55.0 gallon drum or the like that is commonly hammered to produce a percussion instrument commonly referred to as a steelpan drum. The rotation disk 42 has a bottom side 46 and a top side 48, and the rotation disk 42 has a diameter that is greater than a diameter of the mounting disk 28. A sleeve 50 is coupled to and extends upwardly from the rotation disk 42 to restrain the steel barrel 44 on the rotation disk 42. The sleeve 50 extends upwardly from the top side 48 of the rotation disk 42 and the sleeve 50 has an outer surface 52. Furthermore, the sleeve 50 has a diameter that is less than the diameter of the rotation disk 42 such that the outer surface 52 of the sleeve 50 is spaced inwardly from an outer edge 54 of the rotation disk 42, and the sleeve 50 is centrally positioned on the top side 48 of the rotation disk 42.

A plurality of couplers 56 is each of the couplers 56 is coupled to and extends away from the outer surface 52 of the sleeve 50, and the couplers 56 are spaced apart from each other and are distributed around the sleeve 50. Each of the couplers 56 has a hole 58 extending through a respective coupler 56 and the hole 58 in each of the couplers 56 extends along an axis that is perpendicularly oriented with respect to the top side 48 of the rotation disk 42. A drive unit 60 is coupled to the mounting disk 28, the drive unit 60 mechanically engages the rotation disk 42 and the drive unit 60 rotates the rotation disk 42 when the drive unit 60 is turned on. In this way the drive unit 60 rotates the steel barrel 44 to assist a worker 61 that is hammering the steel barrel 44 to manufacture the steelpan drum.

The drive unit 60 comprises a primary gear 62 that has an upper side 64 and an outer edge 66, and the outer edge 66 of the primary gear 62 comprises a plurality of first teeth 68 that are spaced apart from each other and are distributed around a full circumference of the outer edge 66 of the primary gear 62. The primary gear 62 is attached to the rotation disk 42 having the upper side 64 of the primary gear 62 abutting the bottom side 46 of the rotation disk 42. Furthermore, the primary gear 62 is positioned in the opening 34 in the mounting disk 28 such that the primary gear 62 is surrounded by the continuously arcuate portion 38 of the bounding edge 36 of the opening 34.

The drive unit 60 includes a motor 70 that is coupled to the lower surface 30 of the mounting disk 28, the motor 70 has an output shaft 72 and the motor 70 is aligned with the opening 34 in mounting disk 28. The output shaft 72 rotates in a first direction when the motor 70 is turned on and the motor 70 may comprise a multiple speed electric motor or the like. The drive unit 60 includes a drive gear 74 that is coupled to the output shaft 72 of the motor 70 such that the drive gear 74 is surrounded by the rectilinear portion 40 of the bounding edge 36 of the opening 34 in the mounting disk 28. The drive gear 74 has an exterior edge 76 and the exterior edge 76 comprises a plurality of second teeth 78 that are spaced apart from each other and are distributed around the exterior edge. Furthermore, the second teeth 78 engage the first teeth 68 on the primary gear 62 such that the drive gear 74 rotates the primary gear 62 when the motor 70 is turned on for rotating the rotation disk 42.

The drive unit 60 includes a speed control 80 that is mounted to a respective one of the legs 24, the speed control 80 is electrically coupled to the motor 70 and the speed control 80 includes a knob 82 that is rotatably disposed on the speed control 80. The knob 82 is positionable between a minimum position and a maximum position for adjusting a rotational speed of the motor 70 between a minimum speed and a maximum speed. The drive unit 60 includes a power cord 84 that is coupled to and extends away from the speed control 80. The power cord 84 is electrically coupled to the speed control 80, the power cord 84 has a distal end 86 with respect to the speed control 80 and a male plug 88 is electrically coupled to the distal end 86 which can be plugged into a power source 90 comprising a female electrical outlet.

A pad 92 is positioned on the rotation disk 42 such that the steel barrel 44 rests upon the pad 92 when the steel barrel 44 is positioned on the rotation disk 42. Additionally, the pad 92 is comprised of a resiliently compressible material, such as rubber or other similar type of material, to inhibit noise resulting from the steel barrel 44 being hammered when the steel barrel 44 is positioned on the rotation disk 42. The pad 92 is positioned on the top side 48 of the rotation disk 42 and the sleeve 50 surrounds the pad 92.

A plurality of holders 94 is each slidably disposed on the sleeve 50 and each of the holders 94 extends upwardly from the sleeve 50 to engage the steel barrel 44 for securing the steel barrel 44 in the sleeve 50. Each of the holders 94 comprises a leg 96 and a foot 98, the leg 96 of each of the holders 94 has a distal end 100 with respect to the foot 98 and the leg 96 of each of the holders 94 has a threaded portion 102 positioned adjacent to the distal end 100 of the leg 96. The leg 96 of each of the holders 94 extends through the hole 58 in a respective one of the couplers 56 on the outer surface 52 of the sleeve 50 such that the foot 98 of each of the holders 94 is spaced upwardly from the rotation disk 42. Moreover, the foot 98 of each of the holders 94 is directed toward each other such that the foot 98 of each of the holders 94 abuts a top 104 of the steel barrel 44. A plurality of nuts 106 is each threaded onto the threaded portion 102 of the leg 96 of a respective one of the holders 94. Each of the nuts 106 is tightenable against a respective coupler 56 thereby urging the foot 98 on the respective holder 94 downwardly tighten the respective holder 94 on the steel barrel 44.

In use, the steel barrel 44 is placed on the pad 92 such that the sleeve 50 surrounds the steel barrel 44 and each of the nuts 106 on the holders 94 are tightened to secure the steel barrel 44 on the pad 92. In this way the steel barrel 44 is secured on the rotation disk 42 to facilitate the worker 61 to hammer the steel barrel 44 while manufacturing the steelpan drum without the risk of the steel barrel 44 falling off of the rotation disk 42. The knob 82 on the speed control 80 is manipulated to adjust the rotational speed of the motor 70. In this way the steel barrel 44 is rotated at a desired speed to facilitate the worker 61 to hammer the full circumference of the steel barrel 44 without having to walk around the steel barrel 44. Thus, the efficiency of the worker 61 is enhanced by eliminating the need for the worker 61 to walk around the steel barrel 44 or reach across the steel barrel 44 during the manufacturing process of the steelpan drum. The nuts 106 are loosened and the steel barrel 44 is removed from the rotation disk 42 when the manufacturing process of the steelpan drum is completed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A steel barrel rotation assembly for rotating a steel barrel during a manufacturing process, said assembly comprising:
    a base being positionable on a horizontal support surface;
    a plurality of legs, each of said legs being coupled to and extending upwardly from said base;
    a mounting disk being attached to said plurality of legs such that said mounting disk is spaced upwardly from said base;
    a rotation disk being rotatably disposed on said mounting disk wherein said rotation disk is configured to have a steel barrel being positioned on top of said rotation disk;
    a sleeve being coupled to and extending upwardly from said rotation disk wherein said sleeve is configured to restrain the steel barrel on said rotation disk;
    a drive unit being coupled to said mounting disk, said drive unit mechanically engaging said rotation disk, said drive unit rotating said rotation disk when said drive unit is turned on wherein said drive unit is configured to rotate the steel barrel; and
    a plurality of holders, each of said holders being slidably disposed on said sleeve, each of said holders extending upwardly from said sleeve wherein each of said holders is configured to engage the steel barrel for securing the steel barrel in said sleeve.

2. The assembly according to claim 1, wherein:
    said base has a bottom surface, a top surface and a perimeter edge extending between said top surface and said bottom surface, said base having a lip extending upwardly from said top surface, said lip being spaced inwardly from said perimeter edge, said lip extending around a full circumference of said base;
    each of said legs is disposed on said top surface of said base, each of said legs being positioned against said lip, said legs being spaced apart from each other and being distributed around a full circumference of said lip, each of said legs having a distal end with respect to said top surface of said base; and
    said mounting disk has a lower surface and an upper surface, said distal end of each of said legs being coupled to said lower surface such that said mounting disk is aligned with said base.

3. The assembly according to claim 2, wherein said mounting disk has an opening extending through said lower surface and said upper surface, said opening having a bounding edge, said bounding edge having a continuously arcuate portion defining a circle, said bounding edge having a rectilinear portion defining a parallelogram extending away from said circle, said continuously arcuate portion being centrally positioned on said mounting disk.

4. The assembly according to claim 2, wherein:
    said rotation disk has a bottom side and a top side, said rotation disk having a diameter being greater than a diameter of said mounting disk;
    said sleeve extends upwardly from said top side of said rotation disk, said sleeve having an outer surface, said sleeve having a diameter being less than said diameter of said rotation disk such that said outer surface of said sleeve is spaced inwardly from an outer edge of said rotation disk, said sleeve being centrally positioned on said top side of said rotation disk; and
    said assembly includes a plurality of couplers, each of said couplers being coupled to and extending away from said outer surface of said sleeve, said couplers being spaced apart from each other and being distributed around said sleeve, each of said couplers having a hole extending through a respective coupler, said hole in each of said couplers extending along an axis being perpendicularly oriented with respect to said top side of said rotation disk.

5. The assembly according to claim 3, wherein said drive unit comprises a primary gear having an upper side and an outer edge, said outer edge of said primary gear comprising a plurality of first teeth being spaced apart from each other and being distributed around a full circumference of said outer edge of said primary gear, said primary gear being attached to said rotation disk having said upper side of said primary gear abutting said bottom side of said rotation disk, said primary gear being positioned in said opening in said mounting disk having said primary gear being surrounded by said continuously arcuate portion of said bounding edge of said opening.

6. The assembly according to claim 5, wherein said drive unit includes a motor being coupled to said lower surface of said mounting disk, said motor having an output shaft, said motor being aligned with said opening in mounting disk, said output shaft rotating in a first direction when said motor is turned on.

7. The assembly according to claim 6, wherein said drive unit includes a drive gear being coupled to said output shaft of said motor having said drive gear being surrounded by said rectilinear portion of said bounding edge of said opening in said mounting disk, said drive gear having an exterior edge, said exterior edge comprising a plurality of second teeth being spaced apart from each other and being distributed around said exterior edge, said second teeth engaging said first teeth on said primary gear such that said drive gear rotates said primary gear when said motor is turned on for rotating said rotation disk.

8. The assembly according to claim 7, wherein said drive unit includes;

a speed control being mounted to a respective one of said legs, said speed control being electrically coupled to said motor, said speed control including a knob being rotatably disposed on said speed control, said knob being positionable between a minimum position and a maximum position for adjusting a rotational speed of said motor between a minimum speed and a maximum speed; and a power cord being coupled to and extending away from said speed control, said power cord being electrically coupled to said speed control, said power cord having a distal end with respect to said speed control, said distal end having a male plug being electrically coupled to said distal end wherein said male plug is configured to be plugged into a power source comprising a female electrical outlet.

9. The assembly according to claim 4, further comprising a pad being positioned on said rotation disk wherein said pad is configured to have the steel barrel resting upon said pad when the steel barrel is positioned on said rotation disk, said pad being comprised of a resiliently compressible material wherein said pad is configured to inhibit noise resulting from the steel barrel being hammered when the steel barrel is positioned on said rotation disk, said pad being positioned on said top side of said rotation disk having said sleeve surrounding said pad.

10. The assembly according to claim 2, wherein each of said holders comprises a leg and a foot, said leg of each of said holders having a distal end with respect to said foot, said leg of each of said holders having a threaded portion positioned adjacent to said distal end of said leg, said leg of each of said holders extending through said hole in a respective one of said couplers on said outer surface of said sleeve such that said foot of each of said holders is spaced upwardly from said rotation disk having said foot of each of said holders being directed toward each other wherein said foot of each of said holders is configured to abut a top of the steel barrel.

11. The assembly according to claim 10, further comprising a plurality of nuts, each of said nuts being threaded onto said threaded portion of said leg of a respective one of said holders, each of said nuts being tightenable against a respective coupler thereby urging said foot on said respective holder downwardly wherein each of said nuts is configured to tighten said respective holder on the steel barrel.

12. A steel barrel rotation assembly for rotating a steel barrel during a manufacturing process, said assembly comprising:

a base being positionable on a horizontal support surface, said base having a bottom surface, a top surface and a perimeter edge extending between said top surface and said bottom surface, said base having a lip extending upwardly from said top surface, said lip being spaced inwardly from said perimeter edge, said lip extending around a full circumference of said base;

a plurality of legs, each of said legs being coupled to and extending upwardly from said base, each of said legs being disposed on said top surface of said base, each of said legs being positioned against said lip, said legs being spaced apart from each other and being distributed around a full circumference of said lip, each of said legs having a distal end with respect to said top surface of said base;

a mounting disk being attached to said plurality of legs such that said mounting disk is spaced upwardly from said base, said mounting disk having a lower surface and an upper surface, said distal end of each of said legs being coupled to said lower surface such that said mounting disk is aligned with said base, said mounting disk having an opening extending through said lower surface and said upper surface, said opening having a bounding edge, said bounding edge having a continuously arcuate portion defining a circle, said bounding edge having a rectilinear portion defining a parallelogram extending away from said circle, said continuously arcuate portion being centrally positioned on said mounting disk;

a rotation disk being rotatably disposed on said mounting disk wherein said rotation disk is configured to have a steel barrel being positioned on top of said rotation disk, said rotation disk having a bottom side and a top side, said rotation disk having a diameter being greater than a diameter of said mounting disk;

a sleeve being coupled to and extending upwardly from said rotation disk wherein said sleeve is configured to restrain the steel barrel on said rotation disk, said sleeve extending upwardly from said top side of said rotation disk, said sleeve having an outer surface, said sleeve having a diameter being less than said diameter of said rotation disk such that said outer surface of said sleeve is spaced inwardly from an outer edge of said rotation disk, said sleeve being centrally positioned on said top side of said rotation disk;

a plurality of couplers, each of said couplers being coupled to and extending away from said outer surface of said sleeve, said couplers being spaced apart from each other and being distributed around said sleeve, each of said couplers having a hole extending through a respective coupler, said hole in each of said couplers extending along an axis being perpendicularly oriented with respect to said top side of said rotation disk;

a drive unit being coupled to said mounting disk, said drive unit mechanically engaging said rotation disk, said drive unit rotating said rotation disk when said drive unit is turned on wherein said drive unit is configured to rotate the steel barrel, said drive unit comprising:

a primary gear having an upper side and an outer edge, said outer edge of said primary gear comprising a plurality of first teeth being spaced apart from each other and being distributed around a full circumference of said outer edge of said primary gear, said primary gear being attached to said rotation disk having said upper side of said primary gear abutting said bottom side of said rotation disk, said primary gear being positioned in said opening in said mounting disk having said primary gear being surrounded by said continuously arcuate portion of said bounding edge of said opening;

a motor being coupled to said lower surface of said mounting disk, said motor having an output shaft, said motor being aligned with said opening in mounting disk, said output shaft rotating in a first direction when said motor is turned on;

a drive gear being coupled to said output shaft of said motor having said drive gear being surrounded by said rectilinear portion of said bounding edge of said opening in said mounting disk, said drive gear having an exterior edge, said exterior edge comprising a plurality of second teeth being spaced apart from each other and being distributed around said exterior edge, said second teeth engaging said first teeth on said primary gear such that said drive gear rotates said primary gear when said motor is turned on for rotating said rotation disk;

a speed control being mounted to a respective one of said legs, said speed control being electrically coupled to said motor, said speed control including a knob being rotatably disposed on said speed control, said knob being positionable between a minimum position and a maximum position for adjusting a rotational speed of said motor between a minimum speed and a maximum speed; and a power cord being coupled to and extending away from said speed control, said power cord being electrically coupled to said speed control, said power cord having a distal end with respect to said speed control, said distal end having a male plug being electrically coupled to said distal end wherein said male plug is configured to be plugged into a power source comprising a female electrical outlet;

a pad being positioned on said rotation disk wherein said pad is configured to have the steel barrel resting upon said pad when the steel barrel is positioned on said rotation disk, said pad being comprised of a resiliently compressible material wherein said pad is configured to inhibit noise resulting from the steel barrel being hammered when the steel barrel is positioned on said rotation disk, said pad being positioned on said top side of said rotation disk having said sleeve surrounding said pad;

a plurality of holders, each of said holders being slidably disposed on said sleeve, each of said holders extending upwardly from said sleeve wherein each of said holders is configured to engage the steel barrel for securing the steel barrel in said sleeve, each of said holders comprising a leg and a foot, said leg of each of said holders having a distal end with respect to said foot, said leg of each of said holders having a threaded portion positioned adjacent to said distal end of said leg, said leg of each of said holders extending through said hole in a respective one of said couplers on said outer surface of said sleeve such that said foot of each of said holders is spaced upwardly from said rotation disk having said foot of each of said holders being directed toward each other wherein said foot of each of said holders is configured to abut a top of the steel barrel; and a plurality of nuts, each of said nuts being threaded onto said threaded portion of said leg of a respective one of said holders, each of said nuts being tightenable against a respective coupler thereby urging said foot on said respective holder downwardly wherein each of said nuts is configured to tighten said respective holder on the steel barrel.

\* \* \* \* \*